United States Patent
Bosshart et al.

(10) Patent No.: US 10,333,847 B2
(45) Date of Patent: *Jun. 25, 2019

(54) PACKET PROCESSING MATCH AND ACTION UNIT WITH A VLIW ACTION ENGINE

(71) Applicant: TEXAS INSTRUMENTS INCORPORATED, Dallas, TX (US)

(72) Inventors: Patrick W. Bosshart, Plano, TX (US); Hun-Seok Kim, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,041

(22) Filed: May 23, 2018

(65) Prior Publication Data

US 2018/0270154 A1    Sep. 20, 2018

Related U.S. Application Data

(63) Continuation of application No. 14/190,734, filed on Feb. 26, 2014, now Pat. No. 10,009,276.

(60) Provisional application No. 61/770,941, filed on Feb. 28, 2013, provisional application No. 61/919,057, filed on Dec. 20, 2013.

(51) Int. Cl.
*H04L 12/743* (2013.01)
*G06F 9/38* (2018.01)

(52) U.S. Cl.
CPC ...... *H04L 45/7453* (2013.01); *H04L 45/7457* (2013.01); *G06F 9/3853* (2013.01)

(58) Field of Classification Search
None
See application file for complete search history.

(56) References Cited

U.S. PATENT DOCUMENTS

| | | | | |
|---|---|---|---|---|
| 6,249,861 | B1* | 6/2001 | Tremblay | G06F 9/30152 712/204 |
| 9,036,636 | B1* | 5/2015 | Sherwood | H04L 45/04 370/392 |
| 10,009,276 | B2* | 6/2018 | Bosshart | H04L 45/7453 |
| 2007/0266229 | A1* | 11/2007 | Plondke | G06F 9/30149 712/241 |
| 2011/0038375 | A1* | 2/2011 | Liu | H04L 45/7453 370/392 |
| 2012/0011342 | A1* | 1/2012 | Ingle | G06F 12/1027 711/207 |
| 2014/0032569 | A1* | 1/2014 | Kim | G06F 17/3033 707/747 |

(Continued)

*Primary Examiner* — Lonnie V Sweet
(74) *Attorney, Agent, or Firm* — Ebby Abraham; Charles A. Brill; Frank D. Cimino (57) ABSTRACT

An embodiment of the invention includes receiving packet header vectors where a header vector includes a number of packet header words. Match operations are performed on the packet header words. At least one packet header word is modified based on the match operations. At least one processor is used for each packet header word to perform the packet match operations and modify at least one packet header word. Instructions are received from an instruction word where a VLIW instruction word includes all of the instruction words. Each processor performs an operation in response to the instruction word.

16 Claims, 2 Drawing Sheets

(56) References Cited

U.S. PATENT DOCUMENTS

2014/0085958 A1\* 3/2014 Iyengar .................. G11C 15/04
                                                                            365/49.17
2014/0185450 A1\* 7/2014 Luo ........................ H04L 45/42
                                                                             370/236

\* cited by examiner

PACKET PROCESSING MATCH AND ACTION UNIT WITH A VLIW ACTION ENGINE

CROSS-REFERENCE TO RELATED APPLICATIONS

This application is a continuation of U.S. patent application Ser. No. 14/190,734 filed Feb. 26, 2014, which claims priority to U.S. patent application Ser. No. 61/770,941 filed Feb. 28, 2013, and U.S. patent application Ser. No. 61/919,057 filed Dec. 20, 2013, all of which are hereby fully incorporated herein by reference for all purposes.

BACKGROUND

OpenFlow packet processing centers around flow tables containing flow entries, each having ternary values for a selected set of packet header fields. For each packet, flow entries are searched in order, with the first matching entry returned. OpenFlow defines a set of recognized packet header fields including the commonly used Medium Access Control (MAC) source and destination addresses, ether type, Internet Protocol (IP) source and destination addresses, IP protocol, Transmission Control Protocol (TCP) port numbers, Virtual Local Area Network (VLAN) and Multiprotocol Label Switching (MPLS) tags, etc., in addition to user defined extensible fields, and a metadata field to hold non-packet information. The input port Identification (ID) is also provided as a match input.

Associated with each flow entry is a set of actions to be executed upon a match. The defined actions include setting values into any of the packet header's recognized fields, pushing and popping VLAN and MPLS tags, performing Provider Backbone Bridge (PBB) encapsulations and decapsulations, as well as miscellaneous operations such as Time to Live (TTL) manipulations. Actions can also include assigning the packet to an output port and queue, sending the packet to the controller, or dropping it. With OpenFlow still a new and evolving standard, it is anticipated that implementors will create user defined extensions for any required capabilities not yet in the standard, such as other encapsulation types (Generic Routing Encapsulation (GRE), Network Virtualization using Generic Routing Encapsullation (NVGRE), Virtual Extensible Local Area Network (VX-LAN) etc.).

Openflow 1.0 defined a single flow table. Later versions allow multiple tables, numbered and processed sequentially, with actions taken as a result of any stage modifying the packet before it is sent to the next stage. A different action option allows selected modifications to be postponed until after all match stages are executed. A flow entry match also specifies the address of the next table to be executed as a forward-only branch.

Openflow groups provide for implementation of capabilities including multicasting and Equal Cost Multipath (ECMP). An OpenFlow group is a type of action, defined as a collection of buckets, where each bucket contains actions of the types defined above, in addition to optionally recursively containing other groups. OpenFlow ALL groups implement multicast by executing all buckets, each on a different copy of the packet. OpenFlow SELECT groups execute one randomly selected bucket, implementing ECMP, equal cost multipath, and with optional weights attached to each bucket, unequal cost multipath (uECMP). The random selection is typically done by hashing on a selected set of packet headers, so that different flows are routed to different buckets, but all packets from the same flow receive identical treatment. Fast failover groups execute the first bucket associated with a live output port, allowing quick reaction to link failures. OpenFlow indirect groups contain a single bucket, and are useful simply as a layer of indirection.

OpenFlow defines an implementation of meters, which are used to measure data flow rates. Meters are a type of action executable on a flow table match. A meter includes a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band which presumably allows a higher data rate. Meter bands are often informally named with colors, such as green, yellow and red for a three color meter. Openflow provides for remarking the packet Differentiated Services Code Point (DSCP) field as a result of overflowing the base band. This information might be used later to direct the packet to a different queue where it may be more subject to delay or dropping in case of congestion.

OpenFlow defines statistics collecting counters, mostly packet and byte counters, for flow tables, flow table entries, groups and group buckets, meters and meter bands, input/output ports and queues. While most of them are optional, the statistics information they provide are useful to implementers.

As will be explained later, memory requirements for flow tables, action entries and statistics counters contribute a great deal to cost considerations for a large portion of a switch chip.

OpenFlow switches communicate with a network controller through a set of messages defined by the standard. Messages are provided for initial configuration, and for set up, modification, or deletion of flow table, group and meter entries. Statistics information can be requested by the controller and communicated back by the switch. Flow entries can as an action direct a packet to be sent to the controller, and the controller can send packets back to the switch for OpenFlow processing. A common mode of operation is that if a packet is unexpectedly unmatched in a flow table, the packet is sent to the controller, which responds by installing flows into one or more switches. This implements Software Defined Networking (SDN) canonical separation of data plane and control plane processing; switch functionality is confined to matching flows and taking the indicated actions; any unrecognized pattern is sent up to the controller which shoulders the responsibility for all high level decisions.

A description will be provided of the high level design of a match stage, a unit which can be cascaded to implement the core of OpenFlow functionality: providing the flow tables, matching of packet fields against flow table entries, taking the actions indicated by the match, and collecting statistics. U.S. patent application Ser. No. 14/072,989 "An Openflow Match and Action Pipeline" herein incorporated by reference, provides additional background material in this area by describing additional aspects of a match stage implementation. The implementation to be described targets a 64 port by 10 Gbit/s switch, which produces a maximum packet rate of 960M packets/s. If a match stage pipeline is run at 1 GHz or slightly less, each packet has a single clock cycle to flow through the pipe.

The parser accepts the incoming packet data and produces a 4 k bit packet header vector as its output, with each defined header field in a fixed, though configurable, position. This 4 k bit vector provides the input data to the match pipeline of match units. The 4 k bit vector is composed of a number of 8, 16, and 32 bit fields, each of which has an associated valid bit.

OpenFlow defines all tables with ternary matching capability; that is, each table bit can have the ternary values of 0, 1 or don't-care. Wildcarding bits allow single table entries to match a wide variety of packets. At the performance levels targeted, 1 packet per clock cycle, ternary match tables are implemented with TCAM (ternary content addressable memory) modules. Another useful type of table is an exact match table, where no wildcarding is allowed, and packets must exactly match table entries. These can be implemented as hash tables in SRAM, with the advantage that an SRAM is significantly less area, than a TCAM table of equivalent bit count.

Exact match tables are implemented by using SRAMs as hash tables. Generally a hash table takes some or all of the input bits of a search word, and generates a pseudorandom, but predictable, number from those bits. One method of hashing generates an N bit address from an M bit input, where for each of the N hash output bits, a separate M bit mask is and'ed with the input data, and then the parity of the result is taken. The input bit mask for each hash output bit is different, and there are methods known in the art to select masks with desirable properties. This method is equivalent to the mathematical operation of a Galois Field multiplication. There are multiple methods of generating hash addresses known in the art, but all of them attempt to generate an address, where for all data inputs, the addresses end up uniformly distributed across the N bit address space, so that hash table entries are evenly spread out over all words of the SRAMs used for hash table data storage.

Hash tables operate by accessing an array of data at that hashed location and checking to determine whether the accessed data is the desired data. This check is performed by doing a comparison between the desired data and accessed data to determine their equality. Hash tables also have to contend with the possibility of address collisions, where multiple distinct inputs hash to the same address. There are many techniques known in the art for accomplishing this. Multiway hashing addresses this by making K hash addresses instead of one and looking up the data in those K separate locations in K individual arrays. When an entry is to be added, these multi-way hash tables provide several possible locations, all equally good, increasing the probability that one of the locations will be empty.

A further refinement is to implement exact match tables using Cuckoo hash tables, multi-way hash tables distinguished by a fill algorithm providing high hash table occupancy. When adding an entry, if all possible locations for that entry are full, since all current occupants also have other choices for their locations, one of them can be evicted to an alternative location, possibly resulting in a chain of evictions and continuing until an entry is placed in an empty location. Cuckoo hash tables routinely achieve high efficiencies, for example, above 95% occupancy for 4-way hash tables. Reads are deterministically performed in one cycle, with all ways accessed in parallel. While all of this is known art, the essential element is that to implement OpenFlow exact match tables, multi-way hash tables are used where a number (preferably at least 4) separate SRAM modules each compute individual hash keys and determine whether the search data exists at the computed hash location. As a result, a number of SRAM modules are used.

Tables can be made deeper by incorporating additional memory modules, with each memory either adding another way to the hash table or incrementing the number of items contained in an individual way. If multiple items are contained in an individual way, an address lookup yields multiple entries, any of which when compared may turn out to be the desired data. Alternatively, this can be viewed as a multi-bank hash table where some of the banks use the same hashed address, so the number of hash keys is less than the number of banks.

Match data input to tables may vary significantly in width, from single fields to hundreds of bits. For example, a max match width may be 640 bits. Narrower widths can be accommodated by breaking the 640b match memory into units, for example 8 units of 80 bits each. Then these 8 units may be combined to make an 8× deeper table (with 8× the number of entries) or may instead create 8 separate tables. Memory units may be combined in groups, for example 2 units wide for 160 bits, etc. If 4 ways are required in the exact match table of a match stage, this results in an array of 8×4 memory units, each of which can match 80 bit wide data. The 80 bits of match per unit memory is an approximation which will be explained in more detail further below. Each memory is 1000 words deep in this example.

Ternary matches using TCAM are also configured to match wide or narrow entries, with a 640b wide memory split into 8 80 bit units, which like the SRAM exact match memory may be used to create narrow deeper memories or separate memories or combined in groups as desired. Given the larger area of TCAM, less of it is typically provided than exact match memory, for example, ½ or ¼. The TCAM could also be divided into a different number of units, for example into 16 40 bit units.

When either a ternary or exact match is found, it provides several pointers which together contain the required information to perform the desired actions. These include an instruction memory address, an action memory address and size, and a next table address. Actions are performed by modifying fields of the 4000 bit packet header vector. There are 64, 96 and 64 words of 8, 16 and 32b respectively in the packet header vector, with an associated valid bit for each. Note that the number of words of each size described above is illustrative and could easily be changed to larger or smaller numbers in a specific design. As will be described later in more detail, the action engine inventively uses a Very Long Instruction Word (VLIW) architecture, where each of these words has its own functional unit to compute updated values. The units of smaller words can be combined to execute a larger field instruction, for example, 2 8 bit units can merge to operate on their data as a single 16 bit field. There is a VLIW instruction memory with individual instruction fields for each of these words.

OpenFlow specifies simple actions such as setting a field to a value as well as complex operations, such as PBB encapsulate or inner-to-outer or outer-to-inner TTL copies where the outer and inner fields may be one of a number of choices. Complex operations can be easily decomposed into multiple actions on separate fields but complex modifications to each individual field become more difficult as the data line rate increases. These complex modifications can be subroutines at low speeds but must be flattened into single-cycle operations at the packet per clock cycle rate of this device. It is important to provide action capabilities powerful enough to handle the expected types of operations. A general set of conditionalized arithmetic, logical, multiplexing, and bit field manipulation capabilities is provided. Since the chip area of the action engine is dominated by selecting source operands (action data and packet header words) rather than by computation, flexible action capabilities come at relatively low cost.

Action operations may get their sources from packet header fields, or from an action memory. An action indicated by a match may be simple and require only a small amount of data from action memory or complex and require a large amount of data. Action memory is 640 bits wide, and may be output in units of 1, ½, ¼, ⅛, or 1/16 of that full width. Action memory is accessed by providing a size and an aligned pointer. Action memory is separate from instruction memory in the same way that instructions and data are separate entities in a processor. For example, a common action of an IP router is to decrement the IP TTL field, set the MAC source and destination addresses, and set the switch output port and queue. These individual modifications to the various affected fields are all grouped together into a single VLIW instruction where the various needed constants, like subroutine arguments, are in specific places in the delivered action word. While each match entry may require an individual action word for the data constants, they may all reference the same VLIW instruction word. The number of required instruction words is considerably less than the number of required action words.

In addition to the action size and address and the instruction address, a next table address is provided as a result of a match.

The 4 bit action size (to specify from 1× to 1/16× size) and 13 to 17 bit action address (to allow a range of from 8K 640 bit entries to 128 k 40 bit entries) can be combined into a single 18 bit entry as follows:

TABLE 1

Action memory address and size coding

| wwww00000; 1x | 13 bit address |
| wwwwf1000; 1/2x | 14 bit address |
| wwwwff100; 1/4x | 15 bit address |
| wwwwfff10; 1/8x | 16 bit address |
| wwwwffff1; 1/16x | 17 bit address | where w specifies a bit of the word (640 bits) address and f specifies an address of a fractional portion of that 640 bits. As will be seen later, with a maximum of 16 individual tables in a stage and 32 stages, 9 bits are required for a next table address. With an instruction memory of 32 VLIW words per stage, 5 bits are required for instruction address. If all of these fields are contained in extra bits of the match memory, this equals 32 bits of overhead. There are 4 valid bits which together provide both valid and rule version information. There are also 4 field-valid bits. The match data is composed of 8, 16, and 32 bit words from the packet header vector. The 4 field-valid bits allows the rule to check field presence or absence of each individual field. 8 Error Correction Code (ECC) bits are also provided. This totals 48 bits of overhead including ECC. With a 112b memory, 64 bits are provided for match data in a single unit memory, with this detailed explanation showing that less than the 80 bits described above as a general explanation are actually available for matching. When two memories are combined for a wider word, the overhead bits are paid once over a larger width, yielding 168 bits of match data width (with 11 field valid bits). In all cases of appending two or more units, the match width is greater than N×80 bits for N units.

DETAILED DESCRIPTION

An embodiment of the invention includes receiving packet header vectors where a header vector includes a number of packet header words. Match operations are performed on the packet header words. At least one packet header word is modified based on the match operations. At least one processor is used for each packet header word to perform the packet match operations and modify at least one packet header word. Instructions are received from an instruction word wherein a VLIW instruction word includes all of the instruction words. Each processor performs an operation in response to the instruction word.

A detailed description of an embodiment of the invention will now be given. During this discussion, a portion of data from a packet header is referred to as a field, while a portion of data, in 8, 16 and 32 bit sizes in the packet header vector is referred to as a word.

The packet header vector holds data values for all packet header fields of interest for matching against or for modifying through actions. The mapping from well-known packet header fields (Like MAC, IP and TCP) to individual packet header words may not be one-to-one; it may be one-to-many or many-to-one. For example, with 8 bit, 16 bit and 32 bit words available in the packet header vector, a 48 bit MAC source or destination address would be contained in a 32 bit word together with a 16 bit word, or alternatively, 3 16 bit words. A 128 bit IPV6 address would require 4 32 bit words. This illustrates the case of breaking up a packet field due to field size issues. A second reason to break up a packet header field is due to the fact that a packet header field may be composed of a number of individual sub-fields. For example, an MPLS tag is composed of the following fields:

20 bit label
3 bit traffic class
1 bit bottom of stack (BOS) (is innermost mpls tag)
8 bit Time to Live (TTL)

It is possible to hold an MPLS tag in a single 32 bit word. But for the purposes of matching an incoming MPLS tag against a table flow entry, it is likely that the 20 bit label will be matched, possibly along with the 3 bit traffic class and the 1 bit BoS bit, but it is unlikely that the match will want to include the TTL field. Though when matching with either a TCAM for ternary matching or a hash table for exact matching, it is possible to mask off these undesired bits, having those bits present in the match field wastes match width, consuming match table bits while providing no benefit. For that reason, an MPLS field can be separated into an 8 bit TTL field and a 24 bit field with everything else. The 24 bit field would be held in a 16 bit and an 8 bit packet header word; these fields could be used for matching or omitting the 8 bit TTL field.

Another reason to break up a packet header field is to provide smaller atomic sub-header fields for action processing. A common action is to decrement the TTL field of a packet and provide the MPLS TTL with an individual packet header word. This can be done with a simple arithmetic action operation.

In contrast to the one-to-many mapping of packet headers to separate packet header words, multiple packet headers or multiple packet header sub-fields may be mapped to a single packet header word. For example, one byte in an IPV4 header includes the following:
6 bit DSCP
2 bit ECN These two subfields can be combined together into a single packet header word because the type of processing performed on them, such as setting or clearing individual bits or bit fields, can still be done with these sub-fields merged together.

In general, large fields can be composed of smaller sub-fields each with their own packet header word. Fields are broken into multiple packet header words either for size considerations, or because they are logically different entities for the purposes of match or action, so separating them improves match memory efficiency, and may be required so that available instructions are capable of manipulating them individually.

In most cases, fields are not broken into separate words smaller than one byte in size. However, if a packet header byte contains different sub-fields, it is possible to provide each of them with their own 8 bit packet header word for individual processing, masking off bits in other sub-fields, then recombining them at the end of the match-action processing pipeline.

As a result of separating packet header fields into multiple header vector words, an individual OpenFlow action may translate into operations on several header vector words. For example, setting an IPV6 address would write 4 separate 32 bit words. As a more complex example, consider a GRE encapsulation. Encapsulation in general takes a packet, with its headers starting with an L2 (MAC) header and possibly an L3 (IP) header, etc., and puts a new set of headers before the packet, or inserts them into the packet's sequence of headers. GRE encapsulation can start after the L2 header, then it adds a new L3 header, then a GRE header, then continues with the original packet starting with its L3 header. In this example of GRE encapsulation, adding a new L3 (IP) header, IPV4 for example, would add the following fields to create the IPV4 header:
8 bit version=4, IHL (internet header length)
8 bit DSCP+ECN
16 bit total length
32 bit identification, flags, fragment offset (constant, mostly 0's)
8 bit TTL
8 bit protocal
16 bit header checksum
32 bit source IPV4 address
32 bit destination IPV4 address Here are 9 different sub-field representing the IPV4 header. While it is possible that some of them (such as header checksum) might not be explicitly set but rather calculated later using special hardware (the deparser, which puts the packet back together from the packet header vector), a single header field can translate to a number of header vector words and therefore setting a single header can translate into operations on many packet header words.

Described above is just the adding of the L3 header in GRE encapsulation. The GRE header itself must also be added, which ranges in size from one to five×32 bits. There may be cause to separate some of the 32 bit GRE fields into 2×16 bit fields (for example, checksum+offset, or protocal-type+16b-of-other-stuff).

Though the example above was one of the more complex cases, a single action might result in processing on several packet header words. But the action result of a match is not limited to a single logical action; there may be multiple independent actions on unrelated fields. For example, an IP router matches the destination IP (say 32 bit IPV4) address against a table of entries. It usually does not perform just an exact match but a longest prefix match (LPM) where in each table flow entry bits starting from the least significant bit (lsb) can be made don't-cares. With multiple matches possible, the match with the longest prefix (fewest number of lsb don't-cares) wins. One way of doing this type of LPM table is to use TCAMs and arrange the entries in priority order by length of prefix. A typical action as a result of a match is to set the source and destination L2 (48 bit MAC) addresses, decrement the IP TTL, and set the output port and queue (each separate 8 bit or 16 bit packet header words). This requires manipulation of 7 different packet header words (2 each for source and destination MAC addresses, one for TTL, and one each for output port and queue).

As a result, not only can an individual logical action actually result in operations to modify several packet header words, the action entry associated with a flow table match can specify several actions itself, each of which cause one or more operations. Therefore a significant number of packet header words can be modified as a result of a single match.

Recall that the packet rate of 960M packets/sec resulting from the illustrative configuration of 64 ports×10 Gb/s per port forces a design where at a clock rate of 960 MHz or greater (such as 1 GHz), each successive packet progresses through the pipeline of match and action units one clock cycle behind the previous packet. Each packet therefore has a single clock cycle in each pipeline stage. This includes the action portion of the match and action stage. The match and action stage is itself pipelined, with a single packet requiring several clock cycles to go through the entire unit, but with a new packet entering and leaving every clock cycle. If for example, the action unit had a latency of three clock cycles, it would contain three pipeline stages, and in normal operation a different packet would occupy each clock stage.

While this pipeline does not require single cycle latency through the action unit, it does require separate hardware for each pipeline stage. It also precludes lower performance options, such as a single processor which updates the packet header words each in turn by executing instructions in a subroutine. With many packet header words to update, this single processor would be occupied by a packet for many clock cycles, whereas the constraint in this pipeline is that any piece of hardware can only spend a single clock cycle on a packet.

One method would be to provide a number of processors, giving each one the instruction to modify a single packet header word so all of them can execute in parallel. The instruction for each processor would specify input sources (such as packet header words or action words), an operation, and the destination packet header word. This would require a judgment of how many processors to include but tradeoffs can be made to produce efficient implementations with cost growing proportional to capability.

An embodiment of the invention described here, instead of providing a limited number of processors, provides a separate processor for each packet header word. Recall that there are 64, 96, and 64 packet header words of sizes 8 bit, 16 bit and 32 bit respectively in the packet header vector, for a total of 224 packet header words, and therefore there are 224 processors in a match and action unit. Each processor is associated with a specific packet header word so the destination word is implicit for each processor and does not need to be contained in the processor's instruction. This will be referred to as VLIW (Very Long Instruction Word) architecture, and the action processors taken together will be described as the VLIW action engine. The term VLIW is familiar to those skilled in computer design as an architecture where a number of processors are ganged together and fed with a wide instruction having a separate instruction word for each processor. Generally, the instruction words for each processor are arranged and scheduled into the wide instruction word by a compiler, and the wide instruction word is executed as a unit by the processors.

The number of processors described above is contained in a single match and action stage. There are a number of match and action stages, such as 32, in the packet processing pipeline, with 224 processors in each stage, yielding a total number of processors of 32×224=7168 in this example. Though the number of stages may vary and the number of packet header words (and therefore processors) per stage may vary, the total number of processors will remain very large. An additional degree of difficulty is the supplying of instructions to the 224 processors per stage. Recall that packet header words, and therefore processors, come in 8 bit, 16 bit and 32 bit widths. The instruction widths for the different size processors are:

| word width | num processors | instruction width |
|---|---|---|
| 32 bit | 64 | 28 bit |
| 16 bit | 96 | 24 bit |
| 8 bit | 64 | 21 bit |

This yields a total instruction width of 5440 bits. Further difficulty is presented by the fact that a single match and action stage can contain multiple individual flow tables, each of which can produce a match and require an action. There may be up to 16 individual flow tables in a stage. Each of these may produce actions which must be capable of modifying any of the packet header words so each must provide a 5440 bit instruction to the action VLIW engine; a total of 16×5440 instruction bits for each of the 32 match and action stages.

To one skilled in the art, this may seem like an exorbitantly large number of processors fed by a highly unrealistic number of instruction bits with the result that an actual implementation is likely to be severely uneconomical. Yet it will be shown that such an implementation is both feasible and economical. Three areas will be addressed. These three areas are performing the operations required by the instruction set, providing operands, and providing instructions. Each of these issues will now be addressed.

A partial listing of the instruction set for a 32 bit processor is provided below. It will be shown that the gate complexity of implementing these instructions is low. The complexity of these instructions is approximately linear in the number of bits, so gate-count is proportional to bit-width. Instructions whose complexity grows quadratically in the number of bits, or much worse than linearly, are not present in this instruction set. Examples of such instructions are integer multiply and divide, and floating point add, subtract, multiply and divide. Those instructions tend to require large gate counts, and are absent in this implementation. The following is a list of instructions that are approximately linear:
deposit-field
rotate-mask-merge
bitmasked-set
logical; includes and, or, xor, not
shift add/sub
arithmetic; inc dec min max sadd ssub
move
cond-move
cond-mux The deposit-field and rotate-mask-merge instructions are both bit manipulation instructions. The deposit field instruction can take any length field from any position in a source operand and deposit it anywhere into a background operand. The rotate-mask-merge instruction independently byte-rotates each of two sources and then merges them together with byte granularity under the control of a mask. These instructions have two source inputs. For a 32 bit data width, they require a rotator with single bit resolution on one input, and a byte rotator on the other input. The bit resolution rotator can be implemented with a mux4 (a 4 input multiplexer) followed by another mux4, then a mux2, where the first mux rotates by 0, 8, 16 or 24 bits, the second by 0, 2, 4, or 6 bits, and the third by 0 or 1 bits. Variations are possible as known by those skilled in the art but the gate complexity remains largely the same. The byte rotator on the other source input is just a mux4, rotating by 0, 8, 16 or 24 bits.

Bitmasked-set is a three operand instruction which selectively replaces bits in a background word with those from a data word under the control of a mask word. This is useful, for example, for setting selected OpenFlow metadata bits in the packet header vector while leaving unselected bits unchanged. It is the only three operand instruction. The others have at most two operands. The data word and mask word are supplied together as an action constant specified as a single double-width source. So one source address provides the word at an even location for the data word and at the odd location above it for the mask word. The actual merging of data controlled by the mask is a simple 2 input multiplexer gate per bit selecting between the data word and background word with each mux bit select input coming from the mask input. The output of this mux feeds the byte rotator described just above.

Up to this point, the functionality described above requires a rotator on one data source, a byte rotator on the other, two thermometer decoders and a small amount of additional muxing (multiplexing), with logic hardware totaling a few dozen gates per bit. Additionally, an ALU is required which can perform all 16 logical operations of two input variables, as well as add and subtract. The design of such an ALU is easily done by one skilled in the art. The rotator and thermometer decoder hardware allows one input to the ALU to be arbitrarily shifted, and either zero or sign extended.

A final three input mux after the ALU uses the carry-in to the most significant bit (msb), as a function of the instruction, to select one of three sources: the ALU output, or a positive or negative constant. For min/max operations, the positive constant is set to one ALU input, the negative constant is set to the other ALU input, and one of these two constants is always chosen. For saturating adds or subtracts, any of the three mux inputs is possible. The positive constant mux input will be a positive saturation value, while the negative constant mux input will be a negative or zero saturation value. The table below shows the decoding logic for a 32 bit signed add instruction as a function of the two data msb inputs and the carry-in to the msb, which is produced internally by the ALU.

| A<31> | B<31> | cin<31> | outputselect | selectconst |
|---|---|---|---|---|
| 0 | 0 | 0 | ALU | — |
| 0 | 0 | 1 | constant+ | 0x7FFFFFFF |
| 1 | 0 | x | ALU | |

-continued

| A<31> | B<31> | cin<31> | outputselect | selectconst |
|-------|-------|---------|--------------|-------------|
| 0     | 1     | x       | ALU          |             |
| 1     | 1     | 1       | ALU          |             |
| 1     | 1     | 0       | constant−    | 0x10000000  |

Generally, if the sign bit of the two operands is the same and the resulting msb output will be different from that sign, saturation has occurred. The constant+ can be either one ALU input for min/max, or 0x7FFFFFFF for signed saturate or 0xFFFFFFFF for unsigned saturate. The constant—can be either the other ALU input for min/max, or 0x10000000 for signed saturate or 0 for unsigned saturate. This ALU hardware totals to another few dozen gates per bit. The other operations, forms of move and mux instructions, can easily be accommodated within the existing datapath hardware described.

In order to examine the cost of providing operands to the processors, the available operand sources themselves must be described. It has been stated previously that an action memory provides action operands to the processors. The maximum width available from action memory is 2×640 bits, equal to 40×32b in width. To a 32 bit processor, this represents 40 separate 32 bit operands selectable as sources. It is not necessary to provide action constants as both operands to a processor; any computation the processor could do on a pair of constants could be done ahead of time by the compiler and the result placed in a single constant. Let the two operands provided to the processor be called SRC1 and SRC2, or sometimes for convenience, A and B. The action constants will be provided only to SRC1. Source words from the packet header vector will be supplied to both SRC1 and SRC2.

Likewise, it is not necessary to provide action constants to SRC 2 in combination with packet header words to SRC1 (instead of the opposite, action constants to SRC1 and packet header words to SRC2) because the processor instruction set is symmetric where it needs to be. For the two arguments A and B, if f(A,B) exists, then where needed, f(A,B)=f(B,A) also exists. A simple example is one of the logical operators, A-and-notB. The operator B-and-notA (equivalently, notA-and-B) also exists, so if one of the operators is an action constant, that operator can always be placed on SRC1. The subtract operator is an example of an instruction where its symmetric dual can be compiled out and is not needed. The instruction A-B exists, where the B term is a packet header word and A can be an action constant. The presence of both add and subtract instructions, A+B and A-B, allows B to be added in with either polarity. A reverse subtract, B-A, is not needed because the negation of A can be done by the compiler if A is an action constant. Other operators, such as deposit-field and rotate-mask-merge, are symmetric.

There are many operations required of a switch which require copying or moving the contents of one packet header word to another location, or performing some operation on it before writing it to the new location. One example is the pushing and popping of tags or headers. For example, MPLS is a 32 bit tag, placed after the MAC header, which allows multiple instances of itself to be inserted into the packet. The first one in the packet is referred to as the outer tag, etc, all the way to the last one which is referred to as the innermost tag. In the packet header vector, these may be arranged in adjacent words, with the outermost header at a constant address X, and inner headers starting at address X+1 out to however many headers are present or allowed. Pushing a header involves moving each existing header up one location. If the MPLS header is broken into separate subfields, each has a set of locations from outer to inner, and each is moved during a push or pop.

Other more complex fields can be pushed or popped, such as MAC and IP. Outer and inner (or however may are needed) locations are reserved for each subfield, and moves performed on each for push or pop. This helps to introduce the concept of interacting header words. Any particular packet header word will require only a subset of the entire set of packet header words as its operands, or may be used as operands when updating those words. With other packet header words it will have no interaction. For example, it is likely that nested inner/outer MAC fields will interact with each other, but it is unlikely that they will interact with IP fields or TCP fields. Packet header words can be collected into interacting groups, with the result that the separate groups will have no interaction with each other.

This frees each processor from the burden of requiring every single packet header word as an available source. In order to simplify and reduce the cost of the implementation, the packet header words are separated into groups. Within each group, any word in the group can have any other word in the group as a source, but does not require and cannot choose words outside the group as sources. There are 64 32 bit packet header words. These are split into two 32 word groups. There are 96 16 bit packet header words, which are split into three 32 word groups. There are 64 8 bit packet header words, which are split into two 32 word groups. As a result, each processor can select one of 32 words on its SRC1 input, and one of 32 words on its SRC2 input. 8 bit and 32 bit packet header words are split into two groups, while 16 bit packet header words are split into three groups. A listing of processor operand sources from the packet header words and action memory output is as follows:

32 bit:
SRC1:
2 bit action words
32 32 bit packet header words
src2:
2 bit packet header words
16 bit:
SRC1:
6 bit action words
32 16 bit packet header words
src2:
6 bit packet header words
8 b:
SRC1:
8 bit action words
32 8 bit packet header words
src2:
32 8 bit packet header words The requirement of the input multiplexing logic can now be estimated. A mux input requires approximately 1⅓ gates. The total gate requirement is that scale factor times the number of mux inputs times the bit width, summed over all processors per stage, multiplied by the number of stages:

Per stage:

| 64 32 bit processors: | 104 inputs × 2048 bits | 212992 |
| 96 16 bit processors: | 96 inputs × 1536 bits  | 147456 |
| 64 8 bit processors:  | 96 inputs × 512 bits   | 49152  |
| total 409600 mux-bit-inputs per stage | | |

The gate cost is 409600 mux-bit-inputs/stage×4/3 gates/mux-bit-input×32 stages~=17.5M gates The third aspect of action engine functionality is the providing of instructions to the processors. It was described above that action instruction memory is a separate structure from action data memory. Action instructions are like subroutines where action data provides arguments to the subroutines. In an example described earlier in an IP routing table, standard actions are to replace the source and destination MAC addresses, decrement the IP TTL, and set the output port and queue. Each different entry in the IP table will have different values for the MAC addresses and output port and queue ID's, but they will all do the same type of action. Whereas many action data words are required, one for each possible set of data values, only one action instruction is required. An action instruction represents a class of actions, a particular combination of actions. The number of action classes is considerably less than the number of combinations of data used by the action classes. The number of instruction words per stage is set at 32. This number of course serves as an example and may be changed in other implementations, but it is recognized that the number of instructions required is considerably less than the number of action data entries required.

The next issue arises due to the fact that a match and action stage can have a number of individual flow tables, in this case 16, each of which may specify a VLIW instruction to be executed. So the design problem is not to provide a 5440 bit VLIW instruction to the action engine, it is to provide 16 5440 bit VLIW instructions to the action engine.

One fact which simplifies the task of providing instructions is the realization that though there may be up to 16 flow tables in a match and action stage, not all of them are executed. When an entry is matched from a flow table, one of the action outputs is the ID of the next table to be executed. Multiple tables can be arranged in the same match and action stage, where the execution of one may predicate (turn on or off) the execution of subsequent tables. For example, given successive tables A, B and C all in the same match and action stage, if A's match specifies B as the next table, B is executed, whereas if it specifies C or a later table, B is not executed. In the implementation, the tables, including B, are executed speculatively, but predication issues are resolved before any side effects occur. There is a chain of predication logic, calculating in turn whether each successive table in a stage is executed or not, based on prior tables' results. As a result, it is possible to arrange multiple tables in a single stage, yet have only some subset of them actually execute. Action instructions are fetched after this filtering, so only tables which are actually executed need have their instructions fetched.

A second consideration is that if two tables are actually executed in the same stage, they may be performing different functions, so a likely scenario is that their actions will not modify the same packet fields, will not modify the same packet header words. This leads to an implementation limitation that if multiple tables are (after predication checks found to be) executed concurrently in the same match and action stage, the sets of packet header words modified by any pair of such tables must not intersect. Each packet header word should be modified by at most one and only one table's action. If it is the case that two tables execute in the same stage (after predication qualifications) and modify the same packet header word, then the latter of the two tables must be moved to a subsequent match and action stage. In many cases, an action dependency would be indicated which would prevent tables from being arranged in the same stage anyway. For example, if two tables each decrement the IP TTL field, the result of the first table's action is needed as an input to the second table's action, so this action dependency would prevent them from being placed in the same stage. On the other hand, if they both just set the IP TTL field, this would be an action output conflict, which would prevent them from being in the same stage if they could both be executed by the same packet.

The requirement that each packet header word can only be modified by a single table translates to the fact that in any individual clock cycle, for any individual packet, the instruction for each of the 224 processors in a stage can come from only a single one of the 16 tables. As a result, if the instruction 0 is arranged to mean a no-op, do nothing, then the 16 5440-bit VLIW instruction words can be or'ed together into a single 5440 bit combined VLIW instruction word, which provides the final instruction input to the action engine.

The storing of 32 5440-bit instruction words, up to 16 of which can be accessed simultaneously and or'ed together can be efficiently implemented through the use of an inventive or-multiported register file. Each of the 16 flow tables provides as one of its action indications an active bit, stating the table was executed (which includes the effects of predication by prior tables), and a 5 bit action instruction address. For each table, those 6 bits go to a 5 bit to 32 one-hot enabled decoder. This decoder, called an address decoder, produces an output vector of 32 bits, called an address wordline vector. If the active bit is 0, all these output bits are 0. If the active bit is 1, one of the 32 bits is 1, the address of which is specified by the 5 bit action instruction address.

Figure 1:
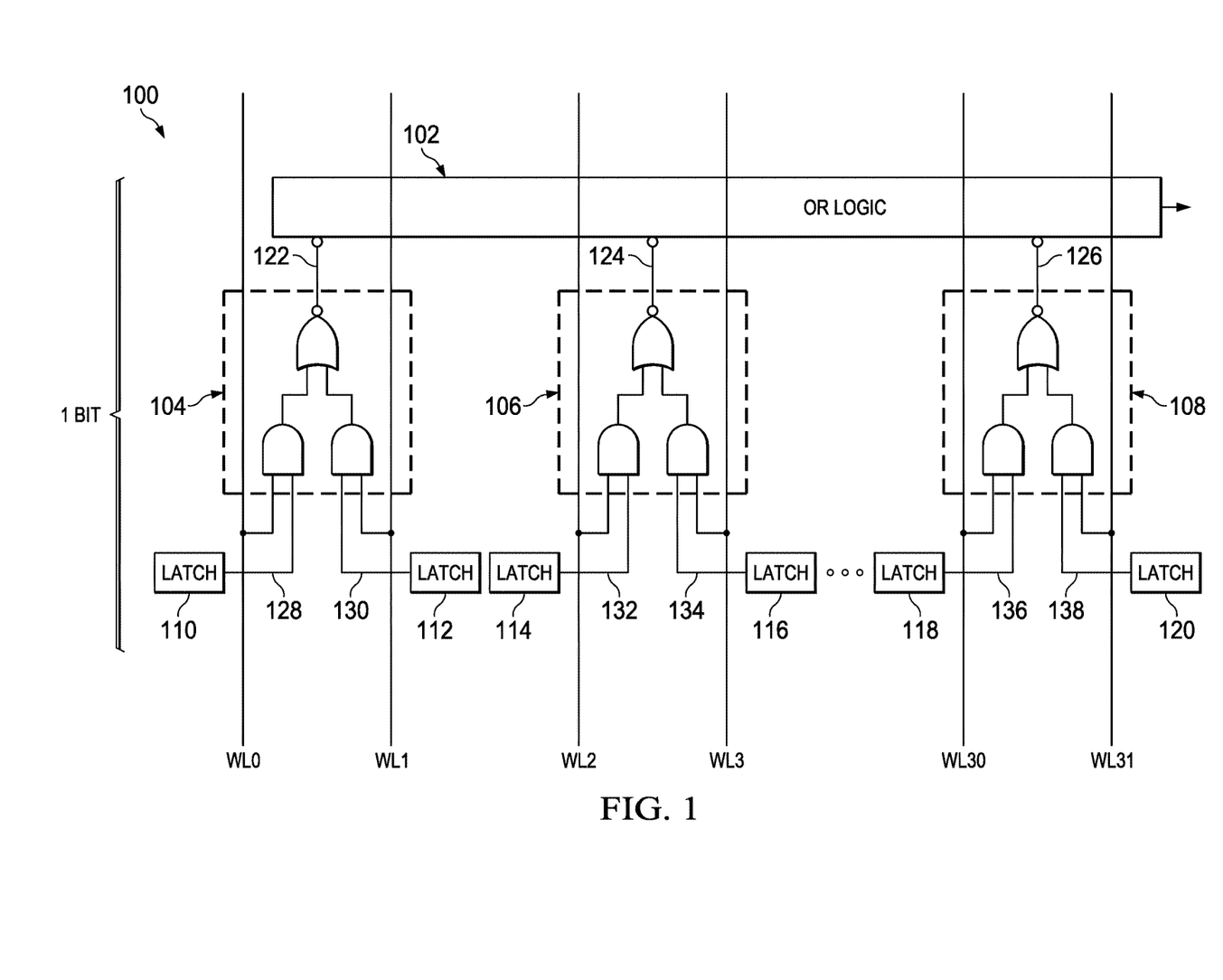
FIG. 1 is a schematic of an OR-multi-ported register file array according to embodiments of the invention.

There is one of these one-hot enabled address decoders for each of the 16 flow tables in a match and action stage, each producing a 32 bit address wordline vector output. All 16 of these 32 bit output address wordline vectors are or'ed together to produce a single 32b combined output vector, the wordline vector. The bit 0's of all 16 are or'ed together to produce the bit 0 of the combined output vector, the bit 1's or'ed together to produce the bit 1 of the combined output vector, and so on for each of the 32 bits. The 32 bits of this combined output vector, the wordline vector, represent the 32 entries in the action instruction memory, and for each bit position which is a 1, that instruction is meant to be or'ed into the combined VLIW instruction word. A circuit 100 to accomplish the reading of each VLIW instruction word and the or'ing of all read words together is shown in FIG. 1, for a portion of a single bit output. A latch 110-120 stores the bit value of each VLIW word for each of the 32 addressed locations. The 32 bits of the combined output vector drive 32 wordlines WL0-WL31, each of which drive an enabling input to an output gate 104-108, whose outputs 122-126 in turn are all or'ed together with OR logical circuit 102. For each bit, this function does 32 AND functions, one for each instruction word, and'ing the instruction word data 128-138 with its wordline output enable WL0-WL31 respectively, then the results 122-126 of the 32 ANDs are or'ed by the OR logical circuit 102 together. In this embodiment, output gates 104-108 perform the function not (AB+CD), where A and C are instruction word data 128-138 and B and D are WL0-WL31. The output gates 104-108 provide the AND function and the first stage of an OR function, or'ing pairs of words together. These 16 outputs are then or'ed together. An embodiment of the invention adjusts for the fact that the data value is represented at the output gates 104-108 in negative logic. This OR logic circuit 102 can be a binary tree, a chain of logic or some combination as is known to those skilled in the art. Tree logic reduces the number of levels of logic and corresponding delay, while chain logic reduces the number of wiring tracks required to connect the logic.

Another aspect of an embodiment of the invention concerns the multi-threaded aspect of the match and action pipeline architecture with respect to the or-multiported register file 100. The resources of a match and action pipeline made from a sequence of these match and action stages can be assigned on a fine-grain to either an ingress thread or an egress thread. Generally, packet processing in a switch inputs packets, parses them into the packet header vector, sends them through an ingress pipeline of match and action stages, deparses them back into packet format, and enqueues them in a centralized data buffer. When pointers to packets reach the head of queue, the packets are read out of the centralized data buffer, parsed, sent through an egress pipeline of match and action stages, then deparsed and output to the appropriate physical port.

As a result, with each processor assigned to ingress or egress, an action instruction in the ingress pipeline will only have instructions populated (non-zero) for packet header words assigned to ingress. Likewise, an action instruction in the egress pipeline will only have instructions populated for packet header words assigned to egress. There are still a total of 32 instructions stored. But it is recognized that for any individual instruction word, any ingress instruction will not overlap with any egress instruction, so with respect to data storage, it is possible to store an ingress instruction and an egress instruction in the same instruction word, with the result that the action instruction memory holds 32 ingress instructions AND 32 egress instructions, rather than simply a total of 32 ingress+egress instructions. This is desirable, because it can effectively double the number of contained instructions. Or, even if ingress or egress doesn't hold the maximum number of instructions, it prevents allocations of ingress instructions from interfering with allocation of instructions for egress and vice-versa.

While the data storage of ingress and egress is shown to be non-conflicting, reading out of instruction data merely as described above cannot accommodate this scheme. If an ingress instruction reads out a word at address A, the egress instruction also stored at that word is also read out, corrupting the egress instruction. What is needed is to identify each word in the packet header vector as ingress or egress, and enable each wordline for only ingress or egress. There must be separate groups of 32 wordlines for ingress and egress. So each wordline decoder (5 bit to one-hot 32b decoder) produces an address wordline vector output as before, which then produces two separate 32 bit vectors, an ingress address wordline vector and an egress address wordline vector. Each address has an address ingress/egress bit associated with it, indicating whether the table producing that address belongs to the ingress or egress pipeline. When the address ingress/egress bit indicates ingress, the address wordline vector is enabled to produce the ingress address wordline vector, and the egress address wordline vector is 0. When the address ingress/egress bit indicates egress, the address wordline vector is enabled to produce the egress address wordline vector, and the ingress address wordline vector is 0. All the ingress address wordline vectors are or'ed together to produce an ingress wordline vector, and all the egress address wordline vectors are or'ed together to produce an egress wordline vector.

These two vectors, the ingress wordline vector and the egress wordline vector form global wordlines for the memory array. These two vectors must each separately enable the output of memory contents for ingress or egress.

Figure 2:
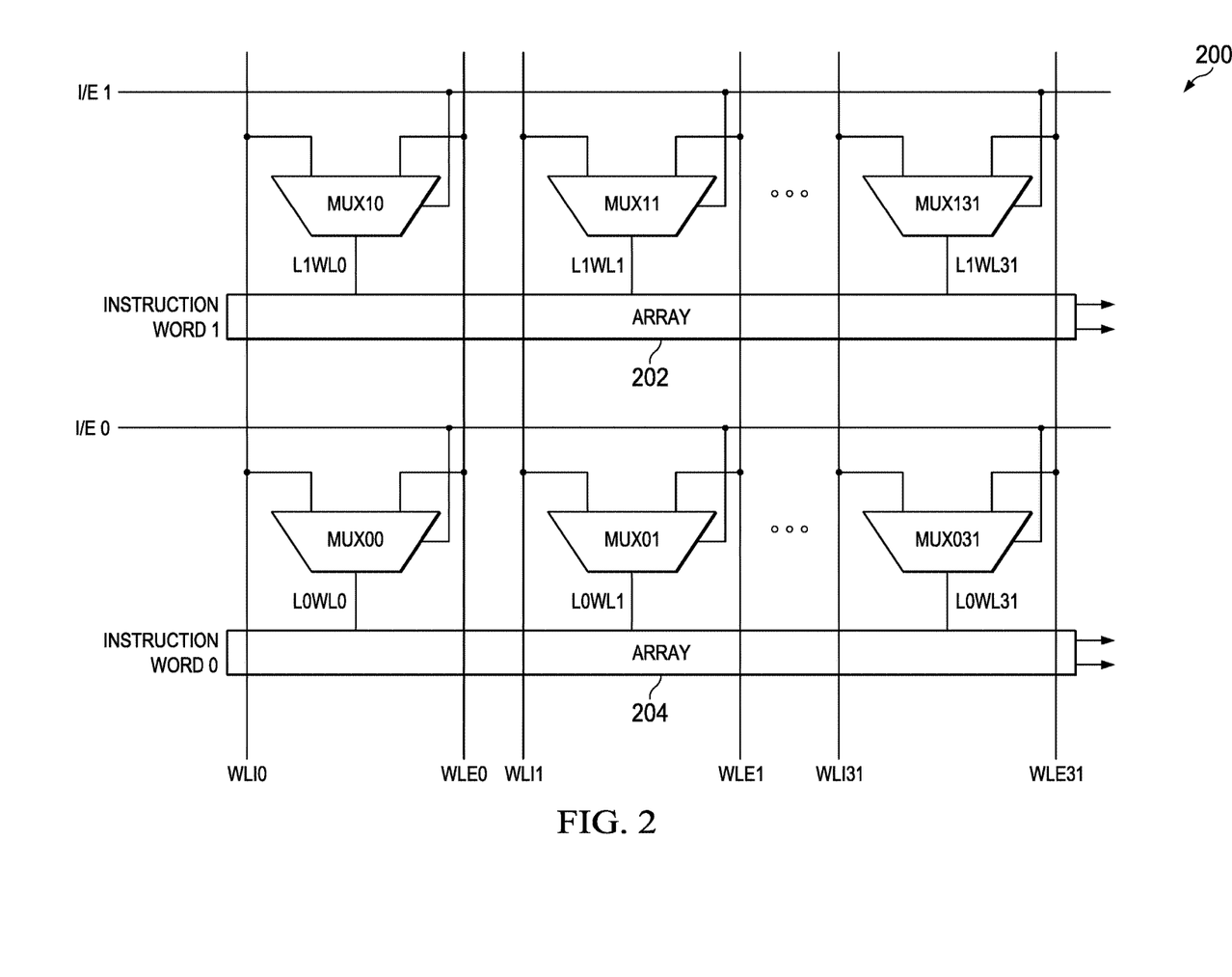
FIG. 2 is a schematic of Ingress/Egress global wordlines and local wordline logic according to embodiments of the invention.

FIG. 2 is a schematic of Ingress/Egress global wordlines, WLI0-WLI31 and WLE0-WLE31 and local wordline logic, MUX00-MUX131 according to embodiments of the invention. Inside the arrays, 202 and 204, consider the global wordlines WLI0-WLI31 to run vertically for the purposes of this discussion. There are now 64 global wordlines WLI0-WLI31 rather than 32 as before. A bit array is 32 words wide in the X dimension by 5440 bits high in the Y dimension. The bit array physical layout in the Y dimension follows the organization of the packet header vector, with 224 separate instructions in the 5440 bit word, one for each of the 224 processors. Each instruction word (28 bits for 32 bit processors, 24 bits for 16 bit processors, and 21 bits for 8 bit processors) is made of bits contiguously located in the Y dimension. Associated with each word is a horizontal word ingress/egress line (I/E0, I/E1, etc.) running across the entire memory identifying that word (0, 1, etc.) as belonging to ingress or egress. For each global wordline pair (one ingress and one egress for a particular memory word) one of them is chosen by the word ingress/egress line using ingress/egress local wordline multiplexers, MUX00-MUX131, whose output is broadcast vertically to the bitcells of the word as a local wordline L0WL0-L1WL31. The 32 ingress wordlines WLI0-WLI31 and 32 egress wordlines WLE0-WLE31 become global wordlines, only connecting to the ingress/egress wordline multiplexers MUX00-MUX131 for each word, and never connecting directly to output bit enable gates.

Note with such a large number of bits to control, 5440, a local/global wordline scheme would have been necessary for circuit reasons. The number of wordlines has doubled, simple local/global buffers have been replaced by multiplexers (the ingress/egress wordline multiplexers), and the outputs of each table's wordline output gate 104-108 has a level of and'ing logic to direct it to be or'ed 102 in to the ingress or egress wordline vector. A 224 bit register (not shown) is added to indicate for each packet header word its membership in ingress vs egress.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. An apparatus for packet processing in a switching network, the apparatus comprising:
    processing circuitry coupled to memory arrays and receiving circuitry;
    the receiving circuitry operable to receive packet header vectors comprising respective packet header words, wherein the packet header vectors are associated with ternary values that are representative of "1", "0", and "don't care";
    the processing circuitry comprising a plurality of processors, including at least first and second processors coupled to a respective first and second end destinations, the first and second processors operable to modify respective first and second packet header words in response to:

at least one packet match operation based on the ternary values; and at least one wide instruction word that provides an instruction to modify the first and second packet header words without specifying the end destination.

2. The apparatus of claim 1 where memory arrays comprise a separate action instruction memory array and a separate action data memory array.

3. The apparatus of claim 1 wherein instructions are received from multiple flow tables.

4. The apparatus of claim 3 wherein one table in the multiple flow tables is an Ether table.

5. The apparatus of claim 3 wherein one table in the multiple flow tables is a MIMS table.

6. The apparatus of claim 3 wherein one table in the multiple flow tables is a VLAN table.

7. The apparatus of claim 3 wherein one table in the multiple flow tables is a GRE table.

8. The apparatus of claims 3 wherein one table in the multiple flow tables is an exact match table.

9. The apparatus of claim 8 wherein the exact match table comprises a hash table.

10. The apparatus of claim 9 wherein the hash table is implemented with static random access memory.

11. The apparatus of claim 9 wherein the hash table is implemented using a cuckoo hash table.

12. The apparatus of claim 11 wherein the cuckoo hash table is implemented using static random access memory.

13. The apparatus of claim 1 wherein the memory arrays are implemented with ternary content addressable memory.

14. The apparatus of claim 1 wherein the first and second processors operate in parallel.

15. A method for packet processing in a switching network, the method comprising:

receiving packet header vectors wherein each packet header vector comprises a plurality of packet header words, wherein the packet header vectors are associated with ternary values that are representative of "1", "0", and "don't care";

modifying, by a processor associated with an end destination, at least one packet header word in response to:

at least one packet match operation; and at least one wide instruction word that provides an instruction to modify the at least one packet header word without specifying the end destination.

16. The method of claim 15 wherein the instructions are received from multiple flow tables.

\* \* \* \* \*